United States Patent
Borhan et al.

(10) Patent No.: US 11,512,630 B2
(45) Date of Patent: Nov. 29, 2022

(54) SYSTEM AND METHOD FOR CONTROLLING OPPOSED PISTON ENGINE OPERATION FOR ROTATION DIRECTION

(71) Applicant: Cummins Inc., Columbus, IN (US)

(72) Inventors: Hoseinali Borhan, Bloomington, IN (US); Dwight A. Doig, Columbus, IN (US); Govindarajan Kothandaraman, Columbus, IN (US); David E. Koeberlein, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 107 days.

(21) Appl. No.: 16/643,724

(22) PCT Filed: Aug. 30, 2018

(86) PCT No.: PCT/US2018/048782
§ 371 (c)(1),
(2) Date: Mar. 2, 2020

(87) PCT Pub. No.: WO2019/046546
PCT Pub. Date: Mar. 7, 2019

(65) Prior Publication Data
US 2020/0232385 A1    Jul. 23, 2020

Related U.S. Application Data

(60) Provisional application No. 62/551,884, filed on Aug. 30, 2017.

(51) Int. Cl.
*F02B 75/28* (2006.01)
*F02D 41/00* (2006.01)
(Continued)

(52) U.S. Cl.
CPC ............. *F02B 75/28* (2013.01); *B60W 10/06* (2013.01); *B60W 10/12* (2013.01);
(Continued)

(58) Field of Classification Search
CPC .......... F02B 75/28; F02B 37/10; F02B 37/24; B60W 10/06; B60W 10/12; B60W 10/196;
(Continued)

(56) References Cited

U.S. PATENT DOCUMENTS 5,608,308 A * 3/1997 Kiuchi .................... B60L 50/10
                                                              322/11
6,675,758 B2 * 1/2004 Nagata ................... B60K 6/485
                                                             123/436
(Continued)

FOREIGN PATENT DOCUMENTS

WO          2015153448 A1    10/2015

OTHER PUBLICATIONS

International Search Report and Written Opinion issued by the ISA/US, Commission for Patents, dated Oct. 25, 2018, for International Application No. PCT/US2018/048782; 7 pages.

*Primary Examiner* — Logan M Kraft
*Assistant Examiner* — John D Bailey
(74) *Attorney, Agent, or Firm* — Faegre Drinker Biddle & Reath LLP (57) ABSTRACT

A method for controlling operation of an opposed piston engine is provided, comprising: determining a direction of rotation of the engine; comparing the determined direction of rotation to a correct direction of rotation of the engine; and responding to the determined direction of rotation being different from the correct direction of rotation by taking corrective action.

20 Claims, 5 Drawing Sheets (51) Int. Cl.

| | | |
|---|---|---|
| *F02D 41/30* | (2006.01) | |
| *F02D 41/04* | (2006.01) | |
| *B60W 10/12* | (2012.01) | |
| *B60W 10/06* | (2006.01) | |
| *F02N 11/08* | (2006.01) | |
| *F02B 37/24* | (2006.01) | |
| *F02B 37/10* | (2006.01) | |
| *B60W 30/192* | (2012.01) | |
| *G01P 13/04* | (2006.01) | |
| *G01P 3/481* | (2006.01) | |
| *B60W 10/196* | (2012.01) | |

(52) U.S. Cl.
CPC ........ *B60W 10/196* (2013.01); *B60W 30/192* (2013.01); *F02B 37/10* (2013.01); *F02B 37/24* (2013.01); *F02D 41/009* (2013.01); *F02D 41/042* (2013.01); *F02D 41/30* (2013.01); *F02N 11/08* (2013.01); *G01P 3/481* (2013.01); *G01P 13/045* (2013.01)

(58) Field of Classification Search
CPC .. B60W 30/192; F02D 41/009; F02D 41/042; F02D 41/30; F02N 11/08; G01P 3/481; G01P 13/045
USPC .......................................................... 60/606
See application file for complete search history.

(56) References Cited

U.S. PATENT DOCUMENTS

| | | |
|---|---|---|
| 7,931,002 B1 | 4/2011 | Gibson et al. |
| 8,136,497 B2 | 3/2012 | Gibson et al. |
| 8,226,525 B2 | 7/2012 | Swales et al. |
| 8,414,456 B2 | 4/2013 | Nedorezov et al. |
| 9,845,753 B2* | 12/2017 | Tateishi ................. F02D 41/042 |
| 2003/0102175 A1* | 6/2003 | Wakashiro ............ F02D 41/123 903/918 |
| 2003/0110854 A1* | 6/2003 | Nakada ..................... G01F 5/00 73/204.22 |
| 2005/0240337 A1* | 10/2005 | Kohler ................ F02D 41/0205 73/114.37 |
| 2006/0162701 A1* | 7/2006 | Kassner ................ F02D 41/009 123/631 |
| 2007/0209619 A1* | 9/2007 | Leone ................... B60W 10/08 123/90.12 |
| 2007/0235005 A1* | 10/2007 | Lewis ....................... F01L 9/20 123/322 |
| 2008/0105230 A1* | 5/2008 | Kishibata ............ F02N 11/0803 123/179.5 |
| 2010/0151988 A1* | 6/2010 | Tabata .................... B60K 6/445 318/434 |
| 2012/0150399 A1* | 6/2012 | Kar ....................... F02D 41/107 701/54 |
| 2013/0116866 A1* | 5/2013 | Perkins ................. F02D 41/062 180/65.265 |
| 2014/0041622 A1* | 2/2014 | Yoshizawa .............. F04B 9/042 123/197.4 |
| 2015/0167590 A1* | 6/2015 | Otto zur Loye .... F02D 41/0007 123/526 |
| 2015/0219060 A1* | 8/2015 | Nakashima ............. F02D 17/00 701/103 |
| 2016/0108842 A1 | 4/2016 | Mirassou et al. |
| 2016/0215781 A1* | 7/2016 | Okuda .................. F04B 25/024 |
| 2017/0282890 A1* | 10/2017 | Fujimoto .............. B60W 10/08 |
| 2019/0195158 A1* | 6/2019 | Dudar ................... F02B 77/083 |
| 2020/0408159 A1* | 12/2020 | Yaakoby ................ F02B 71/04 |

* cited by examiner

SYSTEM AND METHOD FOR CONTROLLING OPPOSED PISTON ENGINE OPERATION FOR ROTATION DIRECTION

CROSS-REFERENCE TO RELATED APPLICATIONS

The present application is a U.S. national stage filing of PCT/US2018/048782, filed on Aug. 30, 2018, which claims priority to U.S. Provisional Application Ser. 62/551,884, entitled "SYSTEM AND METHOD FOR CONTROLLING OPPOSED PISTON ENGINE OPERATION FOR ROTATION DIRECTION," filed on Aug. 30, 2017, the entire disclosures of which being expressly incorporated herein by reference.

FIELD OF THE DISCLOSURE

The present disclosure generally relates to opposed piston engines and more specifically to sensing rotation direction of a crankshaft of an opposed piston engine and controlling the operation of the engine in response.

BACKGROUND OF THE DISCLOSURE

Opposed piston engines are known. Conventional engine position sensors may be used to estimate the position and speed of the crankshafts of such opposed piston engines, but they do not indicate the direction of rotation of the crankshafts. The rotation direction is useful in stop-start applications and engine diagnostics. Thus, there is a need for a system and method for determining the rotation direction of an opposed piston engine and controlling operation of the engine in response thereto.

SUMMARY

In one embodiment, the present disclosure provides a method for controlling operation of an opposed piston engine, comprising: determining a direction of rotation of the engine; comparing the determined direction of rotation to a correct direction of rotation of the engine; and responding to the determined direction of rotation being different from the correct direction of rotation by taking corrective action. In one aspect of this embodiment, determining the direction of rotation of the engine includes: mounting a sensor assembly an operable distance from a wheel mounted to a crankshaft of the engine such that the sensor can detect the presence and absence of teeth disposed about a periphery of the wheel as the teeth move past the sensor assembly with rotation of the crankshaft; and identifying a characteristic of an output signal of the sensor, wherein the characteristic correlates to the direction of rotation of the wheel. In a variant of this aspect, the characteristic is a duration of a pulse of the output signal. In another variant, the sensor assembly is a bi-directional position sensor. In a further variant, the sensor assembly includes a plurality of Hall-Effect sensors. In another aspect of this embodiment, responding to the determined direction of rotation being different from the correct direction of rotation includes at least one of controlling operation of a fuel injector to inhibit fuel injection into the engine, performing engine braking, reducing air flow to a cylinder of the engine, disengaging a transmission, or engaging service brakes. In a variant of this aspect, reducing air flow to a cylinder of the engine includes at least one of disengaging a supercharger, opening a variable-geometry turbocharger, opening a supercharger bypass valve, or stopping operation of an electric motor that assists a turbocharger. Another aspect of this embodiment further comprises restarting the engine using a starter motor upon determining that restart conditions are met.

In another embodiment, the present disclosure provides an engine system, comprising: an opposed-piston engine having a pair of pistons configured to reciprocate in a cylinder, a first piston of the pair of pistons being operatively coupled to a first crankshaft having a first wheel mounted thereon and a second piston of the pair of pistons being operatively coupled to a second crankshaft having a second wheel mounted thereon; a sensor assembly mounted in proximity to the first wheel, the sensor assembly being configured to determine a direction of rotation of the first wheel corresponding to a determined direction of rotation of the engine and to output an output signal having a characteristic correlated to the determined direction of rotation of the engine; a controller coupled to the sensor assembly, the controller being configured to identify the characteristic in the output signal and compare the determined direction of rotation of the engine to a correct direction of rotation of the engine; wherein the controller is further configured to initiate a corrective action in response to the determined direction of rotation of the engine being different from the correct direction of rotation of the engine. In one aspect of this embodiment, the sensor assembly is further configured to detect the presence and absence of teeth disposed about a periphery of the first wheel as the teeth move past the sensor assembly with rotation of the first crankshaft. In another aspect, the characteristic is a duration of a pulse of the output signal. In still another aspect, the sensor assembly is a bi-directional position sensor. In a variant of this aspect, the sensor assembly includes a plurality of Hall-Effect sensors situated in a linear relationship relative to one another on a substrate. In yet another aspect of this embodiment, the corrective action includes at least one of controlling operation of a fuel injector to inhibit fuel injection into the engine, performing engine braking, reducing air flow to the cylinder, disengaging a transmission, or engaging service brakes. In a variant of this aspect, reducing air flow to the cylinder includes at least one of disengaging a supercharger, opening a variable-geometry turbocharger, opening a supercharger bypass valve, or stopping operation of an electric motor that assists a turbocharger. In still another aspect, the controller is configured to initiate restarting of the engine using a starter motor upon determining that restart conditions are met.

In yet another embodiment, the present disclosure provides a sensor assembly for determining a direction of rotation of a wheel mounted to a crankshaft of an engine, comprising: a body having a sensing end; a plurality of sensors mounted on a substrate in a substantially linear relationship relative to one another in the sensing end, the plurality of sensors being configured to detect alternating teeth and recesses disposed about a periphery of the wheel as the wheel rotates; and processing electronics configured to receive signals from the plurality of sensors, process the signals to determine a direction of rotation of the wheel, and output a pulse train indicating the direction of rotation of the wheel. In one aspect of this embodiment, a duration of pulses in the pulse train indicates the direction of rotation of the wheel. In another aspect, the plurality of sensors are Hall Effect sensors spaced apart from one another a distance of approximately 1.25 mm. In yet another aspect, a sequence of disruption of magnetic fields associated with each of the plurality of sensors corresponding to detection of alternating teeth and recesses indicates the direction of rotation of the wheel.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1A:
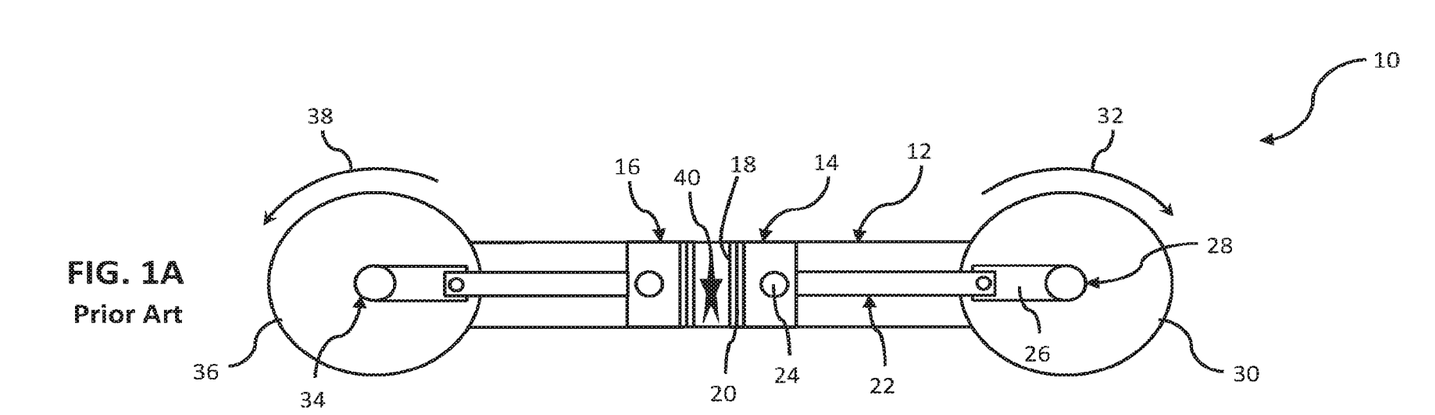
FIGS. 1A-C are conceptual views of a prior art opposed piston engine in different phases of a combustion cycle.
Figure 1B:
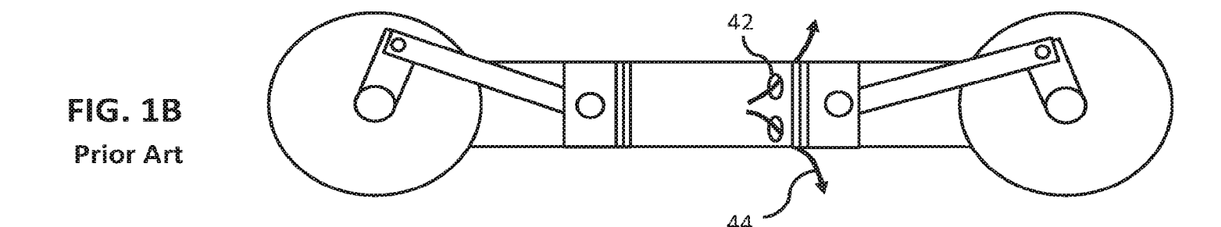
Figure 1C:
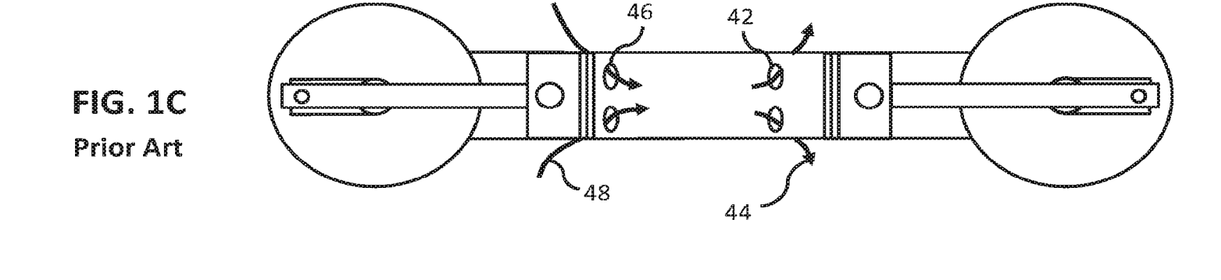

FIGS. 1A-C depict an opposed piston, two stroke engine in three stages of operation. In general, opposed piston combustion engines are engines with two pistons in a single cylinder. The pistons and cylinder define a combustion chamber. The pistons are oriented crown to crown in the cylinder and move toward and away from each other as a result of combustion in the combustion chamber, thereby driving a pair of crankshafts, one connected to each piston.

Referring to FIG. 1A, a portion of an opposed piston engine 10 is shown. As shown, engine 10 includes a cylinder 12 and a pair of pistons 14, 16 disposed therein. Pistons 14, 16 are substantially identical so only piston 14 will be described in detail. Piston 14 includes a crown 18 and a set of piston rings 20, and is coupled to a connecting rod 22 by a piston pin 24. The other end of connecting rod 22 is coupled to a link 26, which is in turn coupled to a crankshaft 28. A wheel 30 is connected to crankshaft 28 for rotation therewith in the manner described herein. Wheel 30 includes a plurality of teeth 54 (FIG. 2) along its perimeter. The direction of rotation of wheel 30 is indicated by arrow 32 in this example, but it should be understood that crankshaft 28 and wheel 30 can rotate in either direction. Piston 16 includes the same parts and is coupled to another crankshaft 34, which also has an attached wheel 36 that rotates with crankshaft 34, in this example, in the direction indicated by arrow 38.

In FIG. 1A, pistons 14, 16 are shown near an inner dead center ("IDC") position, and the fuel/air charge in the combustion chamber is depicted as having combusted (indicated by numeral 40). The energy released from combustion 40 acts against the crowns 18 of pistons 14, 16, driving them in opposite directions.

As the gases expand from combustion 40, pistons 14, 16 move farther apart, and through connecting rods 22 and links 26, cause crankshafts 28, 34 to rotate. FIG. 1B depicts piston 14 in a position in cylinder 12 to reveal exhaust ports 42. Exhaust ports 42 permit exhaust gases to escape from cylinder 12 as indicated by arrows 44. As pistons 14, 16 continue to move away from one another, piston 16 reaches a positon in cylinder 12 to reveal intake ports 46, which permit air to enter cylinder 12 (as indicated by arrow 48) to mix with fuel and provide charge for the next combustion event. The incoming air 48 also forces any remaining exhaust 44 out of exhaust ports 42. In FIG. 1C, pistons 14, 16 are shown near an outer dead center ("ODC") position. As will be understood by those skilled in the art, momentum from combustion 40 cause crankshafts 28, 34 to continue to rotate and move pistons 14, 16 back to the IDC position depicted in FIG. 1A.

As indicated above, in opposed piston engine 10, depending upon the initial starting conditions, crankshafts 28, 34 may be rotated in either a clockwise direction or a counter-clockwise direction. Using conventional engine position sensors, it is not possible to detect the correct direction of rotation of crankshafts 28, 34. Generally, conventional engine position sensors are positioned adjacent a wheel 30, 36 connected for rotation with a crankshaft 28, 34 and detect the presence or absence of teeth disposed about the periphery of the wheel 30, 36. The speed with which teeth are detected may be used to determine the speed of rotation of the crankshaft 28, 34 (and its position), but not the direction of rotation.

Figure 2:
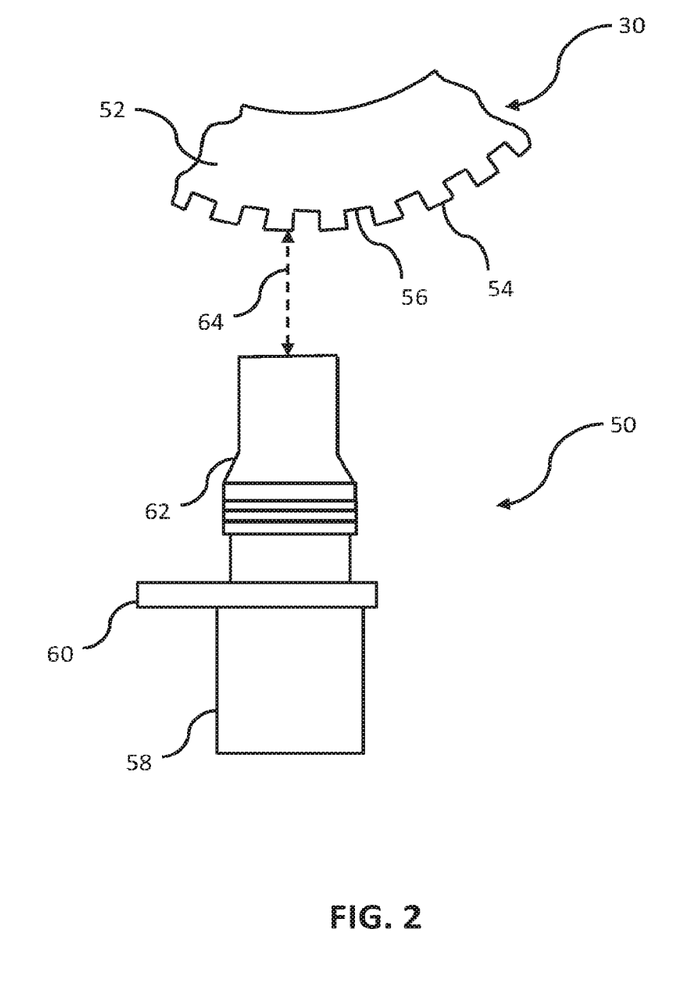
FIG. 2 is a side view of a sensor in proximity to a crankshaft wheel.

Referring now to FIG. 2, a portion of wheel 30 (which is connected to crankshaft 28 as shown in FIG. 1) is shown in proximity to a sensor assembly 50. As shown, wheel 30 includes a body 52 with a plurality of teeth 54 disposed about the periphery of body 52, each tooth 54 being separated from adjacent teeth 54 by recesses 56.

Sensor assembly 50 includes a body 58 having a mounting flange 60 and a sensing end 62. In one embodiment of the present disclosure, sensor assembly 50 is a bi-directional engine position sensor. In certain embodiments of the present disclosure, sensor assembly 50 includes a plurality of Hall Effect sensors (described below) which each generate a magnetic field (generally represented by dashed line 64) for detecting the presence of teeth 54.

Figure 3:
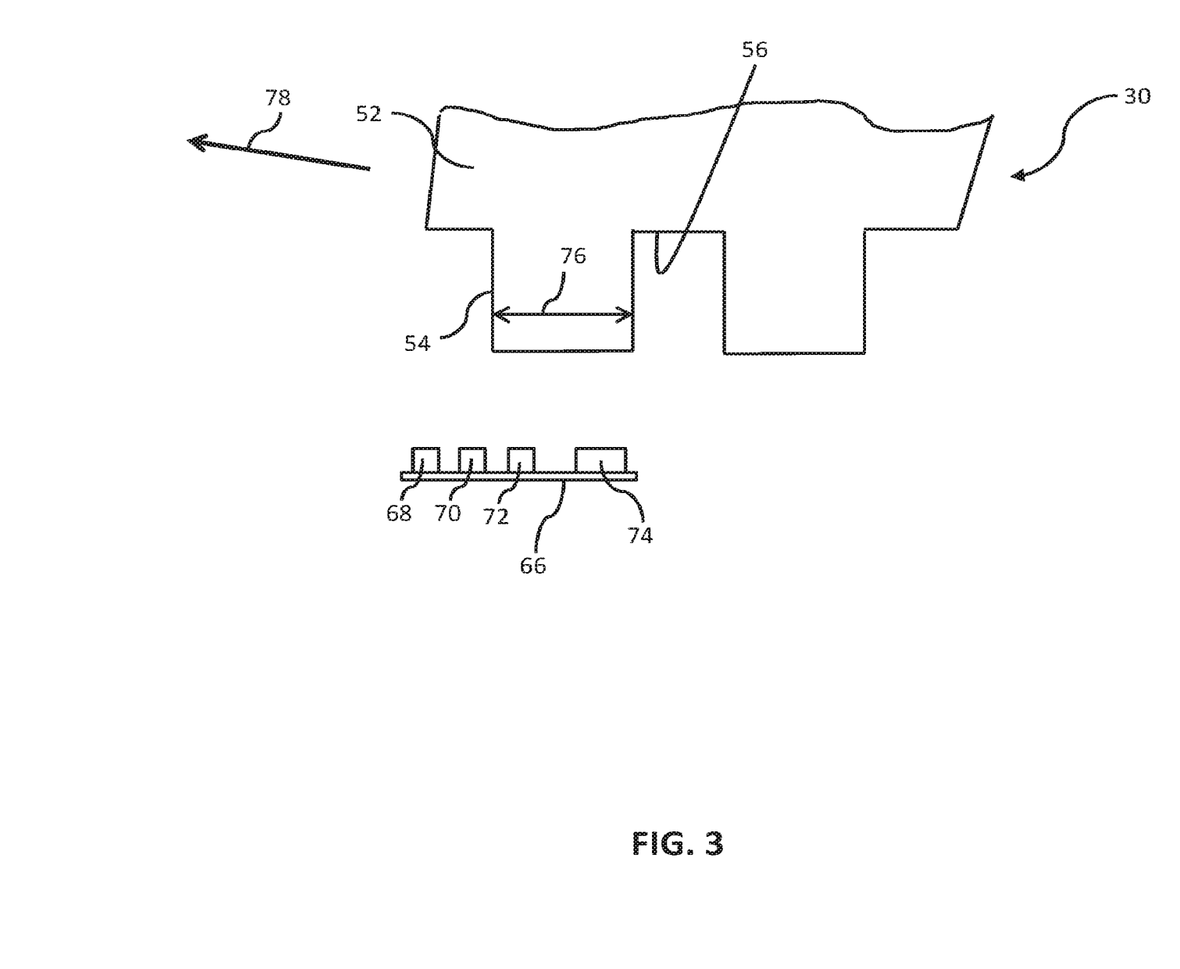
FIG. 3 is a side view of components of the sensor of FIG. 2 in proximity to a crankshaft wheel.

Referring now to FIG. 3, a substrate 66 of sensor assembly 50 is shown in proximity to wheel 30. As shown, substrate 66 generally includes a plurality of Hall Effect sensor 68, 70, 72 and processing electronics generally designated 74. In certain embodiments, sensors 68, 70, 72 are situated in a linear relationship relative to one another on substrate 66, and have centers spaced apart from one another by a distance of approximately 1.25 mm. Such embodiments may be used to detect the direction (and speed) of rotation of teeth 54 having a width of between approximately 4 to 6 mm (as indicated by distance 76 in FIG. 3). In general, processing electronics 74 are configured to receive signals from sensors 68, 70, 72 that provide information about the magnetic field associated with each sensor, process the signals to determine the direction of rotation of wheel 30 and the speed of rotation, and output a pulse train indicating the direction and speed of rotation of wheel 30 to, for example, an engine control module ("ECM") that controls operation of engine 10. Processing electronics 74 may be implemented in a variety of ways using a variety of different electronic components as will be understood by those skilled in the art with the benefit of this disclosure.

In the example depicted in FIG. 3, wheel 30 is rotating in a clockwise direction as indicated by arrow 78. The magnetic field generated by sensor 72 will have already been disrupted by tooth 54 when wheel 30 is in the position shown. The magnetic field generated by sensor 70 will also have begun to be disrupted. The signals provided by sensors 72 and 70 to processing electronics 74 indicate these field disruptions. As wheel 30 continues to rotate, the field generated by sensor 68 will also be disrupted, and eventually, assuming wheel 30 continues to rotate, the fields generated by each of the sensors 68, 70, 72 will return to a non-disrupted state as notch 56 passes over the sensors. As should be apparent from the foregoing, the sequence of disruption of the fields generated by sensors 68, 70, 72 indicates the direction of rotation of wheel 30. In other words, if the field disruption sequence is sensor 72, then sensor 70, then sensor 68, then processing electronics 74 determines that wheel 30 is rotating in a clockwise direction. If the disruption sequence is sensor 68, then sensor 70, then sensor 72, then processing electronics 74 determines that wheel 30 is rotating in a counter-clockwise direction.

By evaluating the signals from sensors 68, 70, 72 to determine when the fields generated by sensors 68, 70, 72 are disrupted and when the fields return to a non-disrupted state, processing electronics 74 can readily calculate the center of tooth 54, which corresponds to the time at which processing electronics 74 outputs a pulse indicating the direction of rotation of wheel 30 as is described below with reference to FIG. 4. As teeth 54 continue to pass over sensors 68, 70, 72, the distance between the pulses output by processing electronics 74 may be used to determine the speed of rotation of wheel 30 as is further described below.

Figure 4:
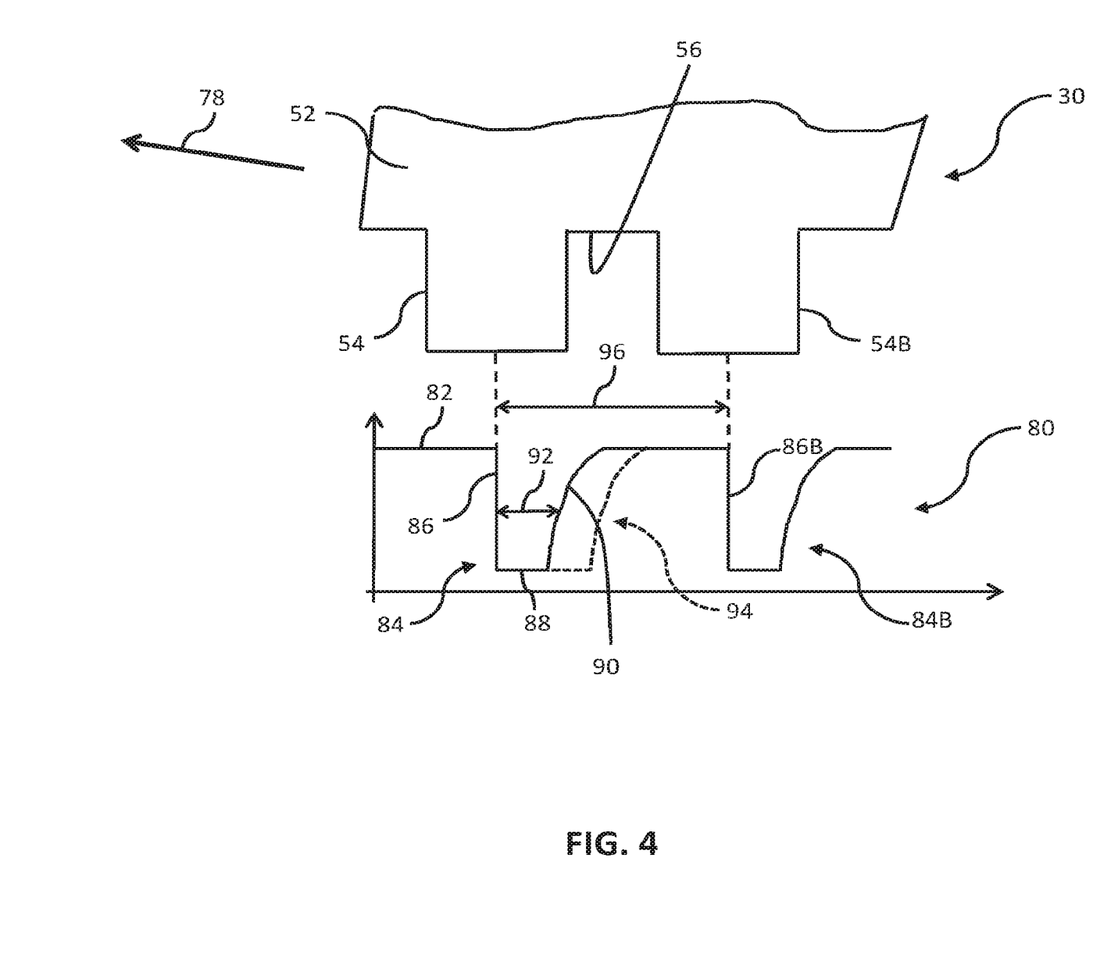
FIG. 4 is a conceptual diagram showing the relationship between the teeth of a rotating wheel and an output signal of a sensor according to the present disclosure.

Referring now to FIG. 4, an output signal 80 is shown as provided by processing electronics 74. In this example, processing electronics 74 is configured to evaluate the signals from sensors 68, 70, 72 as described above to determine the center of tooth 54 and the direction of rotation of wheel 30. The output signal 80 of processing electronics 74 is normally in a high state as indicated by segment 82. To indicate that wheel 30 is rotating in a clockwise direction, in this example processing electronics 74 outputs a negative going pulse 84. Pulse 84 has a falling edge 86, a low state 88, and a rising edge 90. Falling edge 86 coincides with the center of tooth 54. The width of pulse 84 indicates the direction of rotation of wheel 30 as determined in the manner described above. In this example, the width 92 is the time between the falling edge 86 and the rising edge 90 at a voltage that is substantially half way between high state 82 and low state 88. A longer duration pulse 94 is shown in FIG. 4 in dotted lines. This longer duration pulse 94 would be produced by processing electronics 74 if wheel 30 were determined to be rotating in a counter-clockwise direction. In one embodiment, a short duration pulse indicating clockwise rotation is approximately 45 usec. and a long duration pulse indicating counter-clockwise rotation is approximately 90 usec. As wheel 30 continues to rotate in a clockwise direction, tooth 54B passes sensors 68, 70, 72 and results in processing electronics 74 providing a second pulse 84B. In certain embodiments, the time 96 between falling edge 86 of pulse 84 and falling edge 86B of pulse 84B indicates the speed of rotation of wheel 30.

Figure 5:
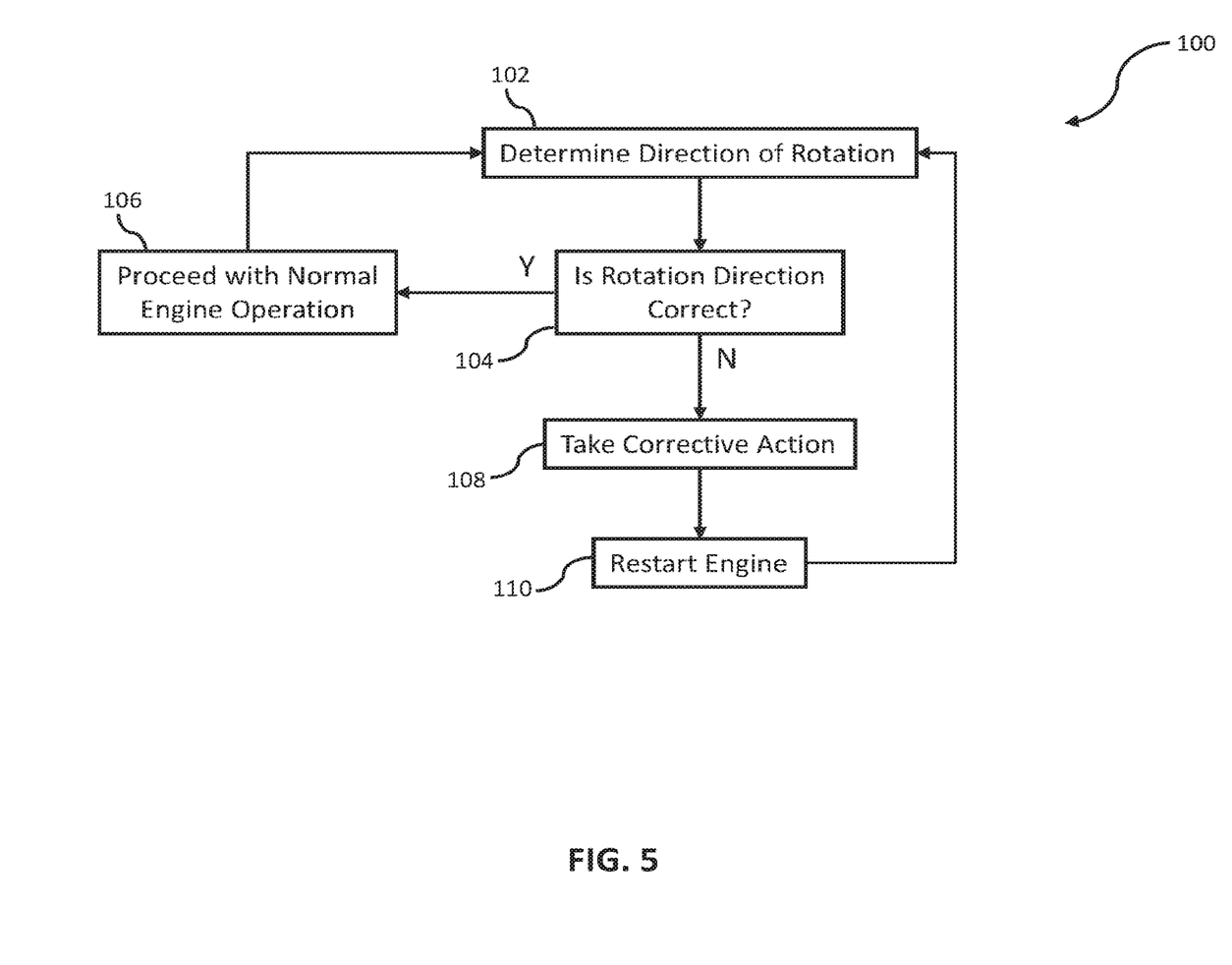
FIG. 5 is a block diagram of a method for controlling operation of an opposed piston engine.

Referring now to FIG. 5, a method 100 for controlling operation of an opposed piston engine is shown. In method 100, the first step 102 is determining the direction of rotation of the engine using, for example, a bi-directional engine position sensor as described above with reference to FIGS. 1-4. Engine position may also be determined at step 102. At step 104, the sensed direction of rotation of the engine is compared to the desired or correct rotation direction. If the rotation direction is correct, then normal engine operation follows as indicated at step 106. Normal engine operation includes, among other things, providing normal fueling control and air system control. The direction of rotation of the engine is then sensed again at step 102, and this loop continues until the sensed direction of rotation is not correct.

When the sensed direction of rotation is not correct at step 104, corrective action is taken at step 108. In certain embodiments, the corrective action results in stopping the engine. In the corrective action step 108, the engine ECM may issue commands to cause the fuel injector(s) to stop delivering fuel to the combustion chamber(s). The ECM may also, or alternatively, control the valves to perform engine braking. The ECM may also, or alternatively, cause a reduction in air flow to the cylinders by, for example, disengaging the supercharger, opening the variable-geometry turbocharger, opening the supercharger bypass valve, and/or commanding the electric motor to stop in systems having electronically assisted turbochargers. The ECM may also, or alternatively, set a fault code indicating incorrect rotation direction and disengage the transmission or engine and activate the vehicle service brakes. Any combination of the above-described corrective actions may be implemented. In such combinations, some of the corrective actions may be implemented substantially simultaneously and some may be implemented sequentially.

At step 110, the engine is restarted, for example, using a starter motor when the start conditions are met after the engine is stopped. As is understood by those of skill in the art, the start conditions may include a variety of engine and vehicle conditions that together indicate that automatic starting of the engine is safe. After the engine is restarted, control is then transferred to step 102 where the direction of rotation of the engine is again sensed. It should be understood that when the engine is restarted and the direction of rotation is correct, the ECM may engage the transmission if the vehicle is at rest.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling operation of an opposed piston engine comprising:
    determining a direction of rotation of the engine while the engine is operating in response to the combustion of fuel;
    comparing the determined direction of rotation to a correct direction of rotation of the engine; and
    responding to the determined direction of rotation being different from the correct direction of rotation by taking corrective action;
    wherein the corrective action includes reducing air flow to a cylinder of the engine by at least one of disengaging a supercharger, opening a variable-geometry turbocharger, opening a supercharger bypass valve, or stopping operation of an electric motor that assists a turbocharger.

2. The method of claim 1, wherein determining the direction of rotation of the engine includes:
    mounting a sensor assembly an operable distance, from a wheel mounted to a crankshaft of the engine such that the sensor can detect the presence and absence of teeth disposed about a periphery of the wheel as the teeth move past the sensor assembly with rotation of the crankshaft; and
    identifying a characteristic of an output signal of the sensor, wherein the characteristic correlates to the direction of rotation of the wheel.

3. The method of claim 2, wherein the characteristic is a duration of a pulse of the output signal.

4. The method of claim 2, wherein the sensor assembly is a bi-directional position sensor.

5. The method of claim 4, wherein the sensor assembly includes a plurality of Hall-Effect sensors.

6. The method of claim 1, wherein responding to the determined direction of rotation being different from the correct direction of rotation includes at least one of controlling operation of a fuel injector to inhibit fuel injection into the engine, performing engine braking, disengaging a transmission, or engaging service brakes.

7. The method of claim 1, further comprising restarting the engine using a starter motor upon determining that restart conditions are met.

8. The method of claim 1, wherein the engine includes a pair of pistons configured to reciprocate in the cylinder.

9. The method of claim 8, wherein the pair of pistons include a first piston operatively coupled to a first crankshaft and a second piston operatively coupled to a second crankshaft.

10. The method of claim 9, wherein a first wheel is mounted on the first crankshaft and a second wheel is mounted on the second crankshaft.

11. The method of claim 1, wherein the corrective action further includes at least one of controlling operation of a fuel injector to inhibit fuel injection into the engine, performing engine braking, reducing air flow to the cylinder, disengaging a transmission, or engaging service brakes.

12. An engine system, comprising:
    an opposed-piston engine having a pair of pistons configured to reciprocate in a cylinder, a first piston of the pair of pistons being operatively coupled to a first crankshaft having a first wheel mounted thereon and a second piston of the pair of pistons being operatively coupled to a second crankshaft having a second wheel mounted thereon;
    a sensor assembly mounted in proximity to the first wheel, the sensor assembly being configured to determine a direction of rotation of the first wheel corresponding to a determined direction of rotation of the engine and to output an output signal having a characteristic correlated to the determined direction of rotation of the engine;
    a controller coupled to the sensor assembly, the controller being configured to identify the characteristic in the output, signal and compare the determined direction of rotation of the engine to a correct direction of rotation of the engine;
    wherein the controller is further configured to initiate a corrective action in response to the determined direction of rotation of the engine being different from the correct direction of rotation of the engine.

13. The engine system of claim 12, wherein the sensor assembly is further configured to detect the presence and absence of teeth disposed about a periphery of the first wheel as the teeth move past the sensor assembly with rotation of the first crankshaft.

14. The engine system of claim 12, wherein the characteristic is a duration of a pulse of the output signal.

15. The engine system of claim 12, wherein the sensor assembly is a bi-directional position sensor.

16. The engine system of claim 15, wherein the sensor assembly includes a plurality of Hall-Effect sensors situated in a linear relationship relative to one another on a substrate.

17. The engine system of claim 12, wherein the corrective action includes at least one of controlling operation of a fuel injector to inhibit fuel injection into the engine, performing engine braking, reducing air flow to the cylinder, disengaging a transmission, or engaging service brakes.

18. The engine system of claim 17, wherein reducing air flow to the cylinder includes at least one of disengaging a supercharger, opening a variable-geometry turbocharger opening a supercharger bypass valve, or stopping operation of an electric motor that assists a turbocharger.

19. The engine system of claim 12, wherein the controller is configured to initiate restarting of the engine using a starter motor upon determining that restart conditions are met.

20. The engine system of claim 19, wherein the restart conditions include engine and vehicle conditions that indicate that automatic starting of the engine is safe.

* * * * *